United States Patent
Hasegawa (10) Patent No.: US 10,641,985 B2
(45) Date of Patent: May 5, 2020

(54) LENS BARREL AND OPTICAL APPARATUS

(71) Applicant: CANON KABUSHIKI KAISHA, Tokyo (JP)

(72) Inventor: Tomoki Hasegawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/992,796

(22) Filed: May 30, 2018

(65) Prior Publication Data

US 2018/0348472 A1 Dec. 6, 2018

(30) Foreign Application Priority Data

May 31, 2017 (JP) ................. 2017-107524

(51) Int. Cl.
| | |
|---|---|
| G02B 7/10 | (2006.01) |
| G03B 17/04 | (2006.01) |
| G02B 7/04 | (2006.01) |
| G03B 3/02 | (2006.01) |

(52) U.S. Cl.
CPC ............ *G02B 7/10* (2013.01); *G02B 7/04* (2013.01); *G03B 17/04* (2013.01); *G03B 3/02* (2013.01); *G03B 2205/0046* (2013.01)

(58) Field of Classification Search
CPC . G02B 7/102; G02B 7/10; G02B 7/04; G03B 17/04; G03B 5/00
USPC .................................. 359/694–823
See application file for complete search history.

(56) References Cited

U.S. PATENT DOCUMENTS

| | | | |
|---|---|---|---|
| 5,032,919 A | 7/1991 | Randmae | |
| 6,381,076 B1* | 4/2002 | Kashiwaba | G02B 7/10 359/701 |
| 8,369,025 B2 | 2/2013 | Suzuki | |
| 8,432,477 B2* | 4/2013 | Honsho | G02B 7/102 348/335 |
| 8,755,129 B2 | 6/2014 | Suzuki | |

(Continued)

FOREIGN PATENT DOCUMENTS

| | | |
|---|---|---|
| CN | 101271184 A | 9/2008 |
| JP | H07043582 A | 2/1995 |

(Continued)

OTHER PUBLICATIONS

Office Action issued in Japanese Appln. No. 2017-107524 dated Mar. 3, 2020. English machine translation provided.

*Primary Examiner* — Mohammed A Hasan (74) *Attorney, Agent, or Firm* — Rossi, Kimms & McDowell LLP (57) ABSTRACT

A lens barrel includes a first moving barrel, a second moving barrel disposed on an object side and an outer circumference side of the first moving barrel and configured to hold an optical element different from a lens, a guide barrel that has a first rectilinear groove that guides a movement of the first moving barrel, and a second rectilinear groove that guides a movement of the second moving barrel in the optical axis direction, and a cam barrel rotatable relative to the guide barrel and having a first cam groove and a second cam groove. The first moving barrel includes a first protruding member engaged with the first rectilinear groove and the first cam groove. The second moving barrel includes a second protruding member engaged with the second rectilinear groove and the second cam groove.

10 Claims, 8 Drawing Sheets

(56) References Cited

U.S. PATENT DOCUMENTS

2007/0153403 A1* 7/2007 Yamazaki ................ G02B 7/10
359/819
2013/0215316 A1* 8/2013 Honsho .................. G02B 7/102
348/335

FOREIGN PATENT DOCUMENTS

| JP | 2001100083 A | 4/2001 |
| JP | 2004151279 A | 5/2004 |
| JP | 2006106241 A | 4/2006 |
| JP | 2006113289 A | 4/2006 |
| JP | 2007206541 A | 8/2007 |
| JP | 2011007856 A | 1/2011 |
| JP | 2013238792 A | 11/2013 |

* cited by examiner

LENS BARREL AND OPTICAL APPARATUS

BACKGROUND OF THE INVENTION

Field of the Invention

The present invention relates to a lens barrel and an optical apparatus having the same.

Description of the Related Art

There have conventionally been a variety of lens-barrel structures having a plurality of lens units movable along an optical axis for zooming and focusing, such as a cam-and-roller structure and a retractable structure in the optical axis direction. The lens barrel (or cylinder) configured to extend a moving frame that holds an optical system causes a dent on a cam and a roller for holding the moving frame when the extending moving frame receives an impact or another external force, and this dent may cause an inclination and decentering of the lens barrel and degrade the optical performance. Japanese Patent Laid-Open No. ("JP") 2004-151279 discloses a lens barrel that includes a moving frame movable in an optical axis direction and a protective frame located on an outer circumference side of the moving frame while they are urged by an urging member so as to separate cam pins from each other, wherein the protective force receiving the external force retreats and absorbs the external force.

According to the lens barrel in JP 2004-151279, the cam pins in the moving frame and the protective frame contact one side groove surface and another side groove surface of each cam groove due to the urging member and a spring load absorbable the external force is necessary in the presence of the unsteadiness in the cam groove. However, when a spring load is made larger so as to endure the impact in a heavy lens barrel would increase the operation torque, deteriorate the durability, and cause another problem, finally degrading the optical performance.

SUMMARY OF THE INVENTION

The present invention provides a lens barrel and an optical apparatus that can restrain influences caused by the impact.

A lens barrel according to one aspect of the present invention includes a first moving barrel configured to hold a lens unit, a second moving barrel disposed on an object side and an outer circumference side of the first moving barrel and configured to hold an optical element different from a lens, a guide barrel that has a first rectilinear groove that guides a movement of the first moving barrel in an optical axis direction of the lens unit in the first moving barrel, and a second rectilinear groove that guides a movement of the second moving barrel in the optical axis direction, and a cam barrel rotatable relative to the guide barrel and having a first cam groove and a second cam groove. The first moving barrel includes a first protruding member engaged with the first rectilinear groove and the first cam groove. The second moving barrel includes a second protruding member engaged with the second rectilinear groove and the second cam groove.

Further features of the present invention will become apparent from the following description of exemplary embodiments with reference to the attached drawings.

DESCRIPTION OF THE EMBODIMENTS

Referring now to the accompanying drawings, a description will be given of an embodiment according to the present invention. Corresponding elements in each figure will be designated by the same references, and a description thereof will be omitted.

Figure 1:
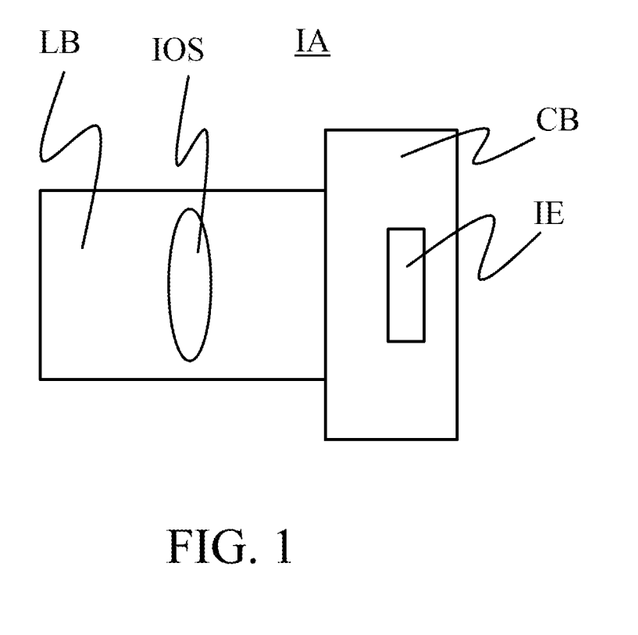
FIG. 1 is a schematic diagram of an imaging optical system that includes a lens barrel according to an embodiment of the present invention.

FIG. 1 is a schematic diagram of an imaging apparatus IA that includes a lens barrel LB according to the embodiment of the present invention. The lens barrel LB holds an imaging optical system IOS. A camera body CB holds an imaging element IE. The lens barrel LB may be integrated with the camera body CB, or detachably attached to the camera body CB. In the following description, a front side is an object side of the lens barrel LB and a backside is a side of the camera body CB.

The present invention is applicable to an optical apparatus, such as an imaging apparatus (e.g., a video camera and a surveillance camera), an observation apparatus (e.g., a binocular), an image projection apparatus, such as a liquid crystal projector, as well as a lens barrel detachably attached to the camera body and a lens integrated type camera.

Figure 2:
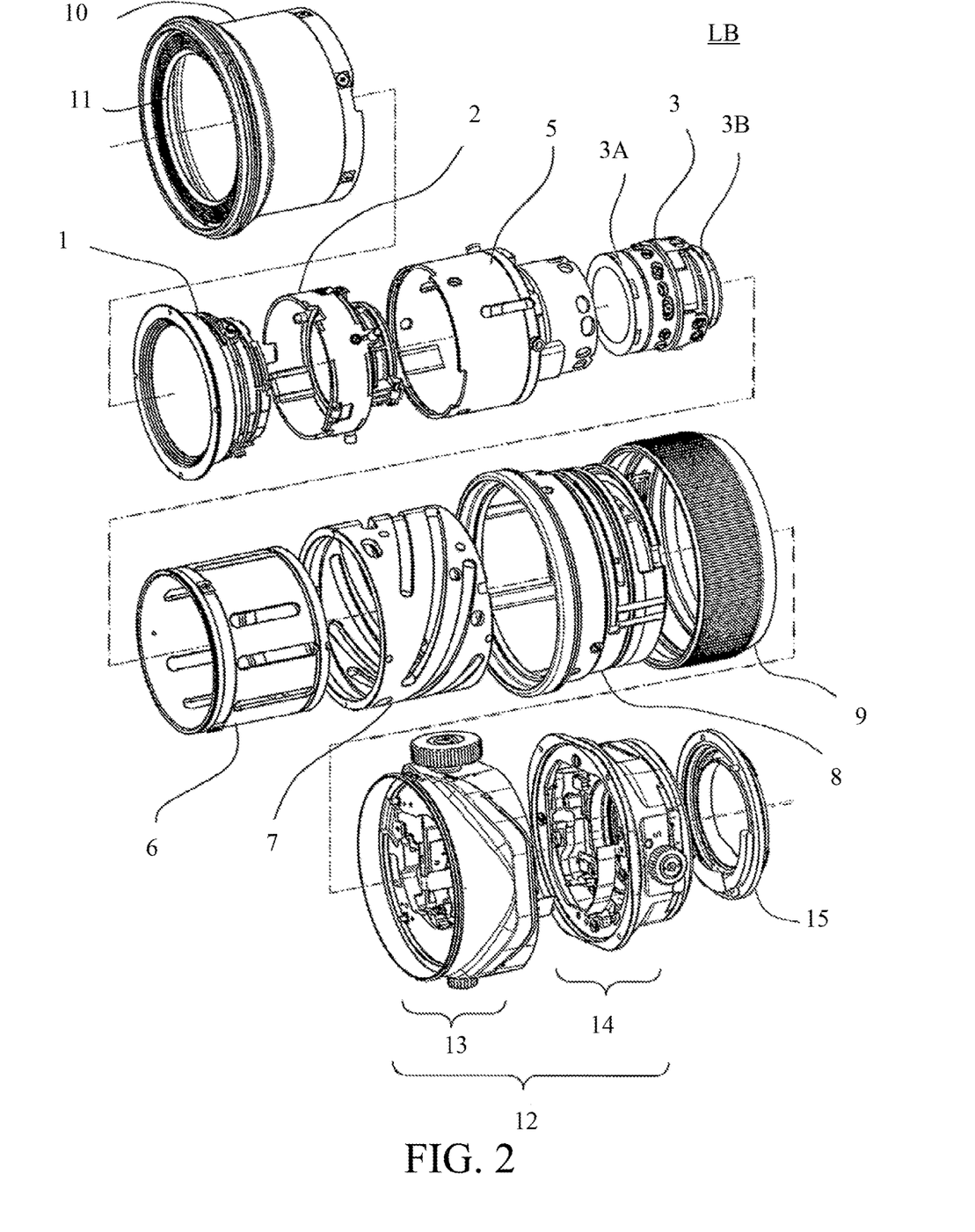
FIG. 2 is an exploded perspective view of the lens barrel.
Figure 3:
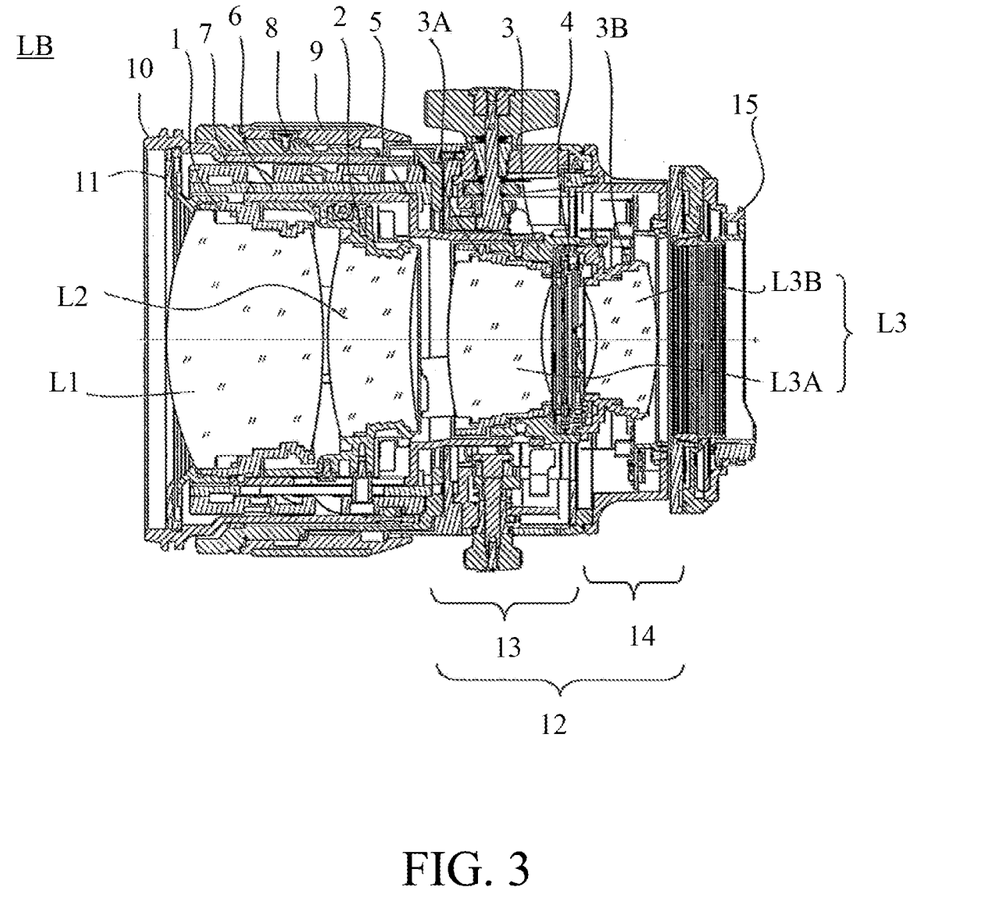
FIG. 3 is a sectional view of the lens barrel focused on infinity.
Figure 4:
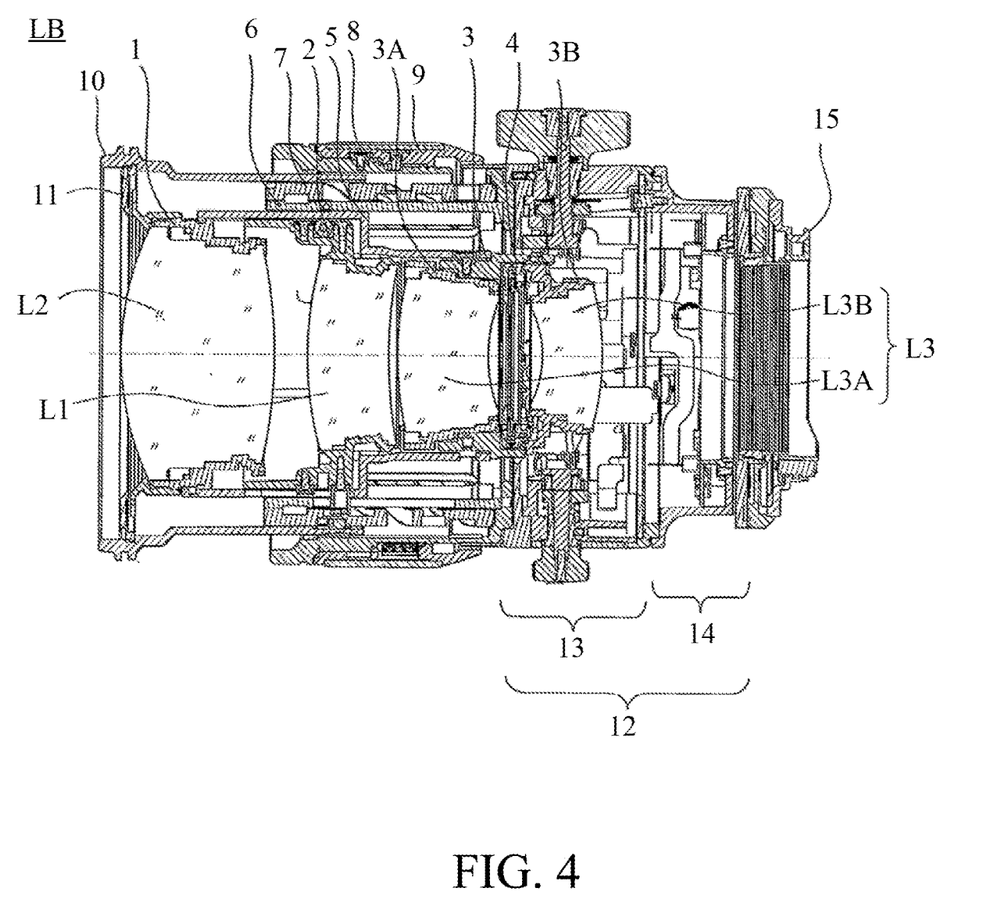
FIG. 4 is a sectional view of the lens barrel focused on a short distance.

FIG. 2 is an exploded perspective view of the lens barrel LB. FIG. 3 is a sectional view of the lens barrel LB focused on infinity (in an extended state). FIG. 4 is a sectional view of the lens barrel LB focused on a short distance (in a retracted state). The lens barrel LB according to this embodiment includes, as the imaging optical system IOS, a first lens unit L1, a second lens unit L2, a third lens unit L3. A first lens holding frame 1 holds the first lens unit L1, and is fixed onto a linear barrel (first moving barrel) 5. A lens holding frame 2 holds the second lens unit L2, and is held on the linear barrel 5 movably in an optical axis direction. A third lens holding frame 3 holds the third lens unit L3, and is fixed onto the linear barrel 5. The third lens holding frame 3 includes a 3A-th lens holding frame 3A and a 3B-th lens holding frame 3B. The third lens unit L3 includes a 3A-th lens unit L3A and a 3B-th lens unit L3B. The lens holding frame 3A holds the 3A-th lens unit L3A, and the lens holding frame 3B holds the 3B-th lens unit L3B.

A diaphragm apparatus 4 is fixed onto the third lens holding frame 3 via unillustrated screws. The diaphragm apparatus 4 includes an unillustrated motor as a driving source and controls driving of the motor so as to change an aperture area in built-in diaphragm blades and to control a light quantity.

A guide barrel 6 is disposed on the outer circumferential side of the linear barrel 5, and includes a plurality of rectilinear grooves that extend in the optical axis direction so as to guide movements of the linear barrel 5 and the moving barrel 10 in the optical axis direction. A cam barrel 7 is engaged with an outer circumference surface of the guide barrel 6, and rotatably supported at a fixed position relative to the guide barrel 6 in the optical axis direction. A body barrel (or cylinder) 8 fixes the guide barrel 6 on the inner circumference surface side through screws. An operating ring 9 is engaged with an outer circumference surface of the body barrel 8, and rotatably supported at a fixed position. An unillustrated key coupled with the cam barrel 7 is attached to the operating ring 9. A moving barrel 10 (second moving barrel) 10 can hold a filter as an optical element and includes a hood mounting part at a front tip end on the outer circumference side, and a filter screw part on the inner circumference side. In addition, the moving barrel 10 includes a front cover 11 screwed with the filter screw part. The moving barrel 10 according to this embodiment can hold the filter as an optical element different from the lens unit, but may hold the lens unit.

The cam barrel 7 has three cam grooves (first cam grooves) engaged with three rollers (first protruding members) provided on the outer circumference surface of the linear barrel 5, and guide grooves engaged with rollers provided on the outer circumference surface of the second lens holding frame 2. The cam barrel 7 has cam grooves (second cam grooves) engaged with rollers (second protruding members) provided on an inner circumference surface of the moving barrel 10. Three rollers on the linear barrel 5 are engaged with three rectilinear grooves (first rectilinear grooves) formed in the guide barrel 6, and the rollers on the moving barrel 10 are engaged with other rectilinear grooves (second rectilinear grooves) in the guide barrel 6. The rollers of the second lens holding frame 2 are engaged with the rectilinear grooves in the linear barrel 5.

When the operating ring 9 is rotated, the cam barrel 7 rotates via the coupled key. Each of the linear barrel 5, the second lens holding frame 2, and the moving barrel 10 moves along the optical axis while guided by the rectilinear grooves engaged with their rollers in accordance with the locus of each cam groove in the cam barrel 7. Since the linear barrel 5 and the second lens holding frame 2 have different loci for the corresponding cam grooves, they move back and forth while changing an interval between the first lens holding frame 1 fixed on the linear barrel 5 and the second lens holding frame 2 and an interval between the first lens holding frame 3 fixed on the linear barrel 5 and the second lens holding frame 2. Operating the operating ring 9 can move each lens unit from the state focused on the infinity object illustrated in FIG. 3 to the state focused on the short distance (or near) object illustrated in FIG. 4, and provides focusing depending on the object distance.

A tilt and shift mechanism part 12 is fixed onto the body barrel 8 by unillustrated screws, and includes a tile mechanism 13 and a shift mechanism 14. The tilt mechanism 13 can tilt the optical axis in the imaging optical system IOS relative to the imaging plane on the imaging element IE. The shift mechanism 14 can move the optical axis in the imaging optical system IOS in a direction orthogonal to the optical axis relative to the imaging plane of the imaging element IE. Hence, tilting by the tilt mechanism 13 and shifting by the shift mechanism 14 can provide tilt/shift imaging. In addition, the tilt and shift mechanism part 12 includes a revolving mechanism that revolves the lens barrel LB around the optical axis relative to the camera body CB, and a revolving mechanism that revolves the tilt mechanism 13 around the optical axis so as to change the relative directional relationship between the shifting and the tilting. A mount 15 is used to attach the lens barrel LB to the camera body CB, and fixed onto the tilt and shift mechanism part 12.

Figure 5:
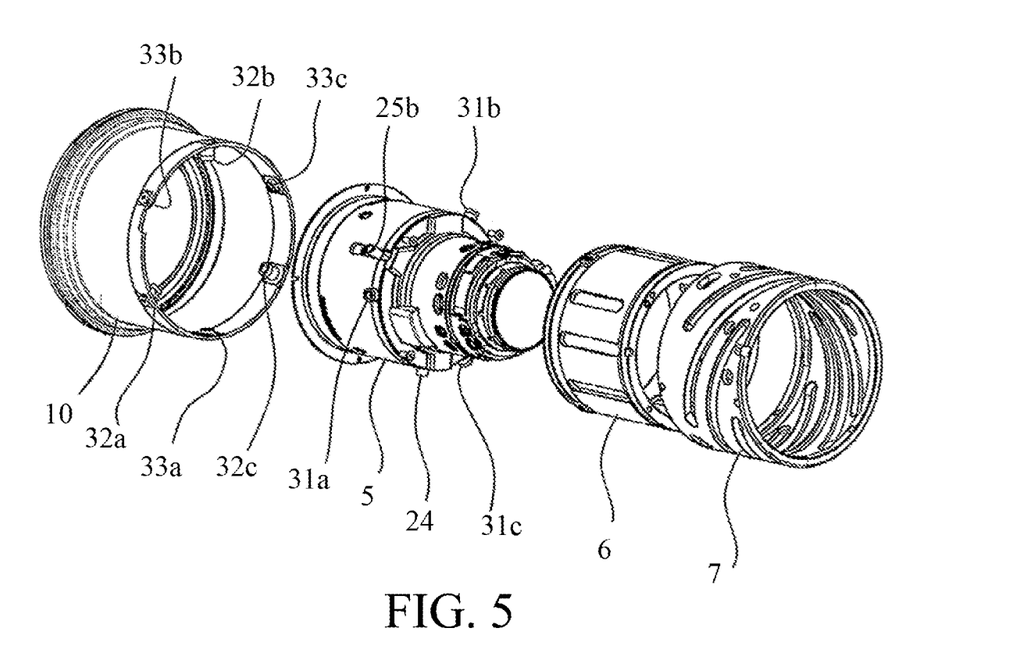
FIG. 5 is an exploded perspective view of a moving mechanism part.
Figure 6:
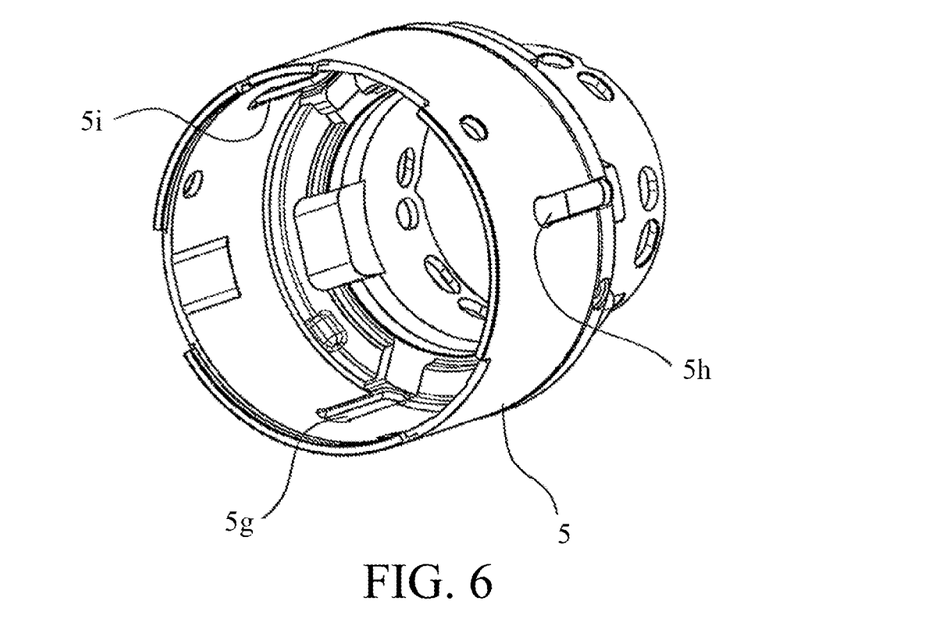
FIG. 6 is a perspective view of a linear barrel (linearly moving cylinder or barrel).
Figure 7:
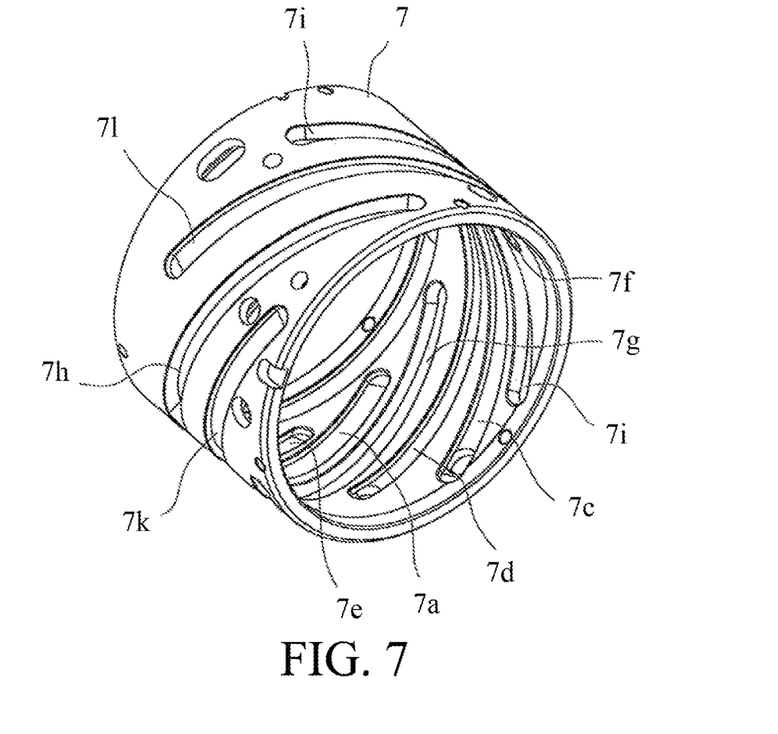
FIG. 7 is a perspective view of a cam barrel (or cylinder).
Figure 8:
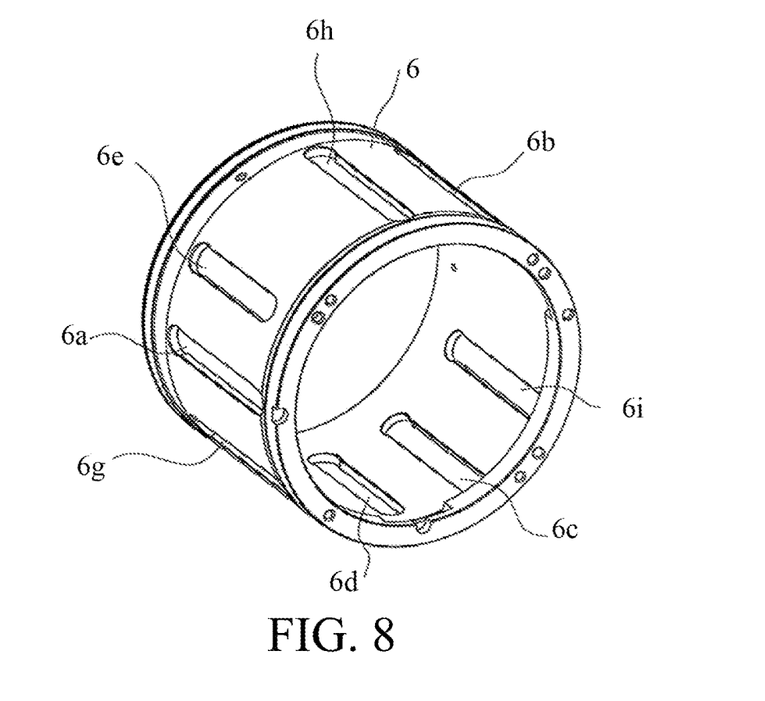
FIG. 8 is a perspective view of a guide barrel (or cylinder).

Next follows a description of a moving mechanism part that moves along the optical axis in the lens barrel LB. FIG. 5 is an exploded perspective view of the moving mechanism part viewed from the backside. FIG. 6 is a perspective view of the linear barrel 5 viewed from the front side. FIG. 7 is a perspective view of the cam barrel 7 viewed from the backside. FIG. 8 is a perspective view of the guide barrel 6 viewed from the backside.

Three rollers 31a, 31b, and 31c are screwed on the outer circumference surface of the linear barrel 5. The guide barrel 6 has three perforating grooves 6a, 6b, and 6c that extend in the optical axis direction, and the rollers 31a, 31b, and 31c are engaged with the rectilinear grooves 6a, 6b, and 6c. Three non-perforating cam grooves 7a, 7b (not shown), and 7c are formed on the inner circumference surface of the cam barrel 7, and engaged with the rollers 31a, 31b, and 31c. The cam barrel 7 is rotatably supported at a fixed position relative to the guide barrel 6 in the optical axis direction as descried above, and as the cam barrel 7 rotates, the linear barrel 5 is moved along the optical axis by the cam grooves 7a, 7b, and 7c while linearly guided by the rectilinear grooves 6a, 6b, and 6c. Since the first lens holding frame 1 and the third lens holding frame 3 are fixed onto the linear barrel 5, as the linear barrel 5 moves, the first lens holding frame 1 and the third lens holding frame 3 integrally move.

Figure 9:
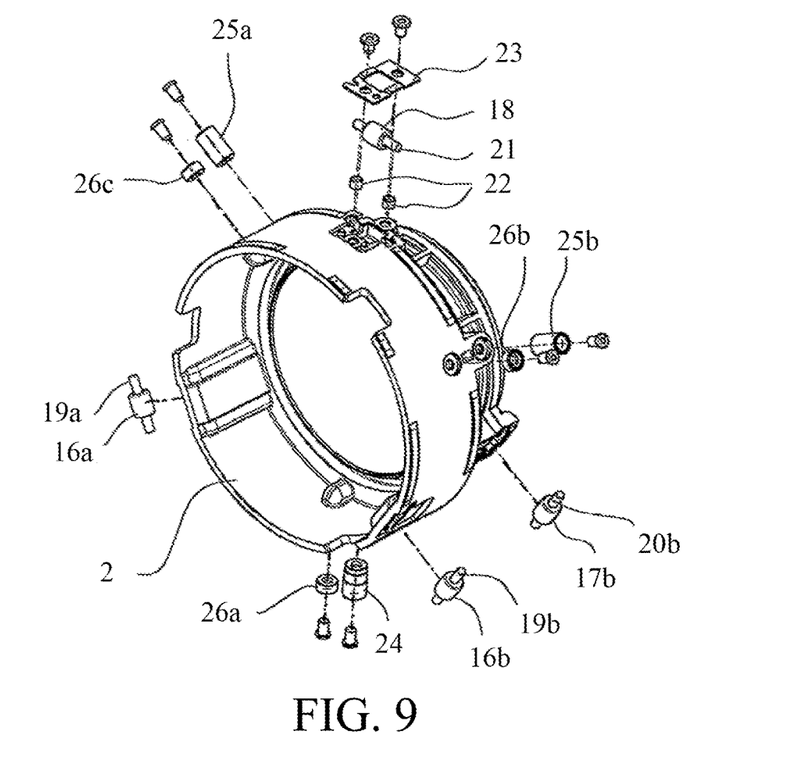
FIG. 9 is an exploded perspective view of a second lens holding frame.
Figure 10:
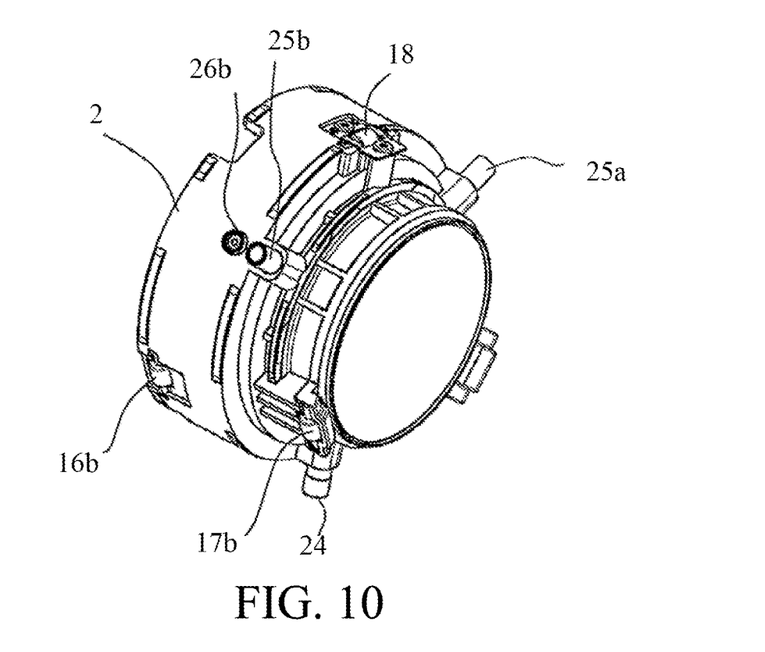
FIG. 10 is a perspective view of the second lens holding frame.

A description will now be given of the structure of the second lens holding frame 2 movably held relative to the linear barrel 5 on the inner circumference surface side of the linear barrel 5. FIG. 9 is an exploded perspective view of the second lens holding frame 2 viewed from the front side. FIG. 10 is a perspective view of the second lens holding frame 2 viewed from the backside.

Each holder for roller shafts 19a and 19b is provided on the outer circumference surface of the second lens holding frame 2 and extends in a direction orthogonal to the optical axis direction and the diameter direction of the second lens holding frame 2 or in a tangential direction on the outer circumference surface. The roller shafts 19a and 19b support the rollers 16a and 16b rotatably around the tangential direction. In addition, each holder for roller shafts 20a (not shown) and 20b is provided at the back of the outer circumference surface of the second lens holding frame 2 and extends in the tangential direction. The roller shafts 20a and 20b support the rollers 17a and 17b rotatably around the tangential direction.

A holder for a roller shaft 21 that extends in the tangential direction and an assembly unit for an urging or forcing springs 22 are provided near the center of the outer circumference of the second lens holding frame 2. The roller shaft 21 rotatably supports the forcing roller 18 around the tangential direction. Each urging spring 22 urges the urging roller 18 in a diameter direction of the second lens holding frame 2. A press plate 23 urges the urging roller 18 against the diameter direction of the second lens holding frame 2. The press plate 23 prevents the urging roller 18 and the roller shaft 21 from disengaging from the second lens holding frame 2 due to reactions of the urging springs 22 after the urging roller 18 is assembled in the second lens holding frame 2, and the press plate 23 is screwed onto the second lens holding frame 2. Before the second lens holding frame 2 is assembled into the linear barrel 5, the roller shaft 21 contacts the press plate 23 and serves as disengagement preventive means.

The rollers 16a and 17a are arranged at positions with the same angular phases around the optical axis, and the rollers 16b and 17b are arranged at positions with the same angular phases around the optical axis. The urging roller 18 is disposed opposite to the rollers 16a, 16b, 17a, and 17b with respect to the optical axis in the radial direction of the second lens holding frame 2.

In the optical axis direction, the rollers 16a and 16b are arranged in front of the center of gravity position of the moving unit that includes the second lens unit L2 and the second lens holding frame 2, and the rollers 17a and 17b are arranged at the back of the center of gravity position of the moving unit.

Each of the rollers 16a, 16b, 17a, and 17b and the urging roller 18 contacts and is supported on the rolling surface of each roller formed in the inner circumference part of the linear barrel 5. The urging roller 18 is urged in the diameter direction (urging direction) by the urging springs 22, as described above. The second lens holding frame 2 receives the reactions as a result of that the urging springs 22 press the urging roller 18 against the rolling surface, is urged in a direction (lower direction in FIG. 9) opposite to the urging direction, and is supported on the linear barrel 5 at four points of the rollers 16a, 16b, 17a, and 17b. The second lens holding frame 2 is urged and supported at the four points of the rollers while moving along the optical axis in the linear barrel 5, and thus the relative inclination change between the second lens holding frame 2 and the linear barrel 5 can be restrained.

A roller 24 is screwed on the outer circumference surface side of the second lens holding frame 2. The roller 24 is engaged with a perforating rectilinear groove 5g in the rectilinear groove 5, and a cam groove 7d in the inner circumference surface side of the cam barrel 7. Thereby, the second lens holding frame 2 is supported at four points on the above roller, is linearly guided by the rectilinear groove 5g in the linear barrel 5, and linearly moves along the optical axis by the cam groove 7d as the cam barrel 7 rotates. The roller 24 may be disposed on a plane that contains the reaction direction form the roller surface and the optical axis, and is disposed at a position different from the urging roller 18 by 180° phase on the side opposite to the urging roller 18 with respect to the optical axis in this embodiment.

Rollers 25a and 25b are screwed on the second lens holding frame 2. The roller 25a is provided between a rectilinear groove 5i formed in the rectilinear groove 5 and a cam groove 7f formed in the cam barrel 7 and separated from them by predetermined distances. The roller 25b is provided between a rectilinear groove 5h formed in the rectilinear groove 5 and a cam groove 7e formed in the cam barrel 7 and separated from them by predetermined distances. The rollers 25a and 25b serve as a shock absorber.

Rollers 26a, 26b, and 26c are screwed onto the second lens holding frame 2. Each of the rollers 26a, 26b, and 26c is provided among the rectilinear grooves 5g, 5h, and 5i in the linear barrel 5, is separated from them by predetermined distances, and serve as a shock absorber.

Figure 11:
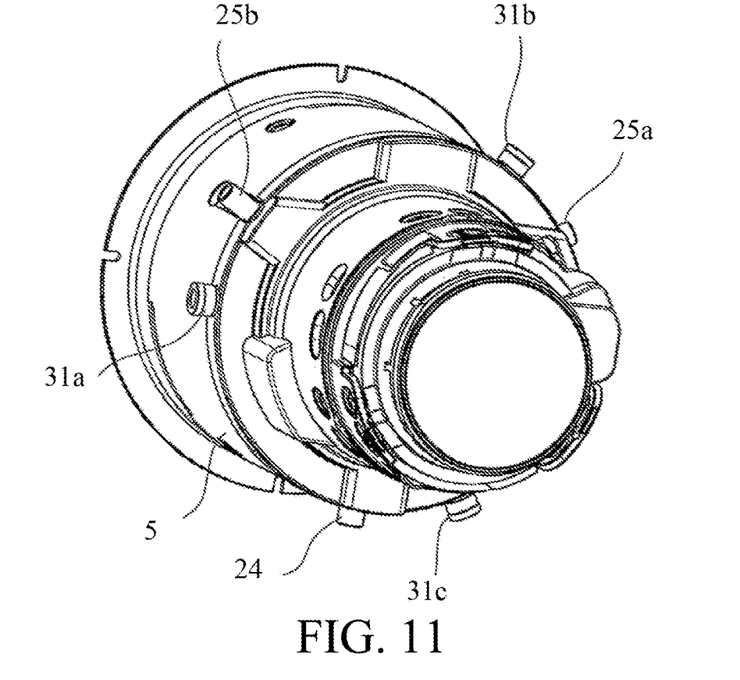
FIG. 11 is a perspective view of a linear barrel that holds the second holding frame.
Figure 12:
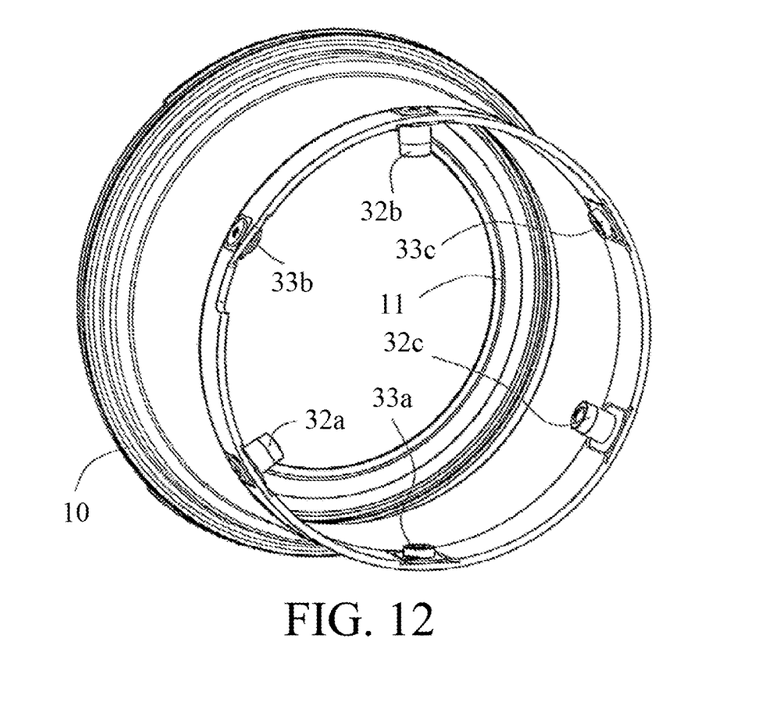
FIG. 12 is a perspective view of a moving barrel.

FIG. 11 is a perspective view of the linear barrel 5 that holds the second lens holding frame 2. FIG. 12 is a perspective view of the moving barrel 10.

Three first rollers 32a, 32b, and 32c are screwed on the inner circumference surface of the moving barrel 10. Three perforating rectilinear grooves 6g, 6h, and 6i extend in the optical axis direction in the guide barrel 6, and are engaged with the first rollers 32a, 32b, and 32c. The cam barrel 7 has three perforating cam grooves 7g, 7h, and 7i, which are engaged with the first rollers 32a, 32b, and 32c. The cam loci of the cam grooves 7g, 7h, and 7i are the same as those of the cam grooves 7a, 7b, and 7c engaged with the rollers 31a, 31b, and 31c on the linear barrel 5. As the cam barrel 7 rotates, the moving barrel 10 is linearly guided by the linear barrels 6g, 6h, and 6i, and moved along the optical axis by the cam grooves 7g, 7h, and 7i. In this embodiment, the loci of the cam grooves which the linear barrel 5 and the moving barrel 10 follow are equal to each other but may be different from each other.

Three second rollers 33a, 33b, and 33c are screwed on the inner circumference surface of the moving barrel 10. A length (first protruding amount) of each of the second rollers 33a, 33b, and 33c in the radial direction is shorter than a length (second protruding amount) of each of the first rollers 32a, 32b, and 32c in the radial direction. The guide barrel 6 has three perforating rectilinear grooves 6d, 6e, and 6f (not shown) that extend in the optical axis direction. The cam barrel 7 has, on its outer circumference surface side, three non-perforating cam grooves 7j (not shown), 7k, and 7l, into which the second rollers 33a, 33b, and 33c are inserted with predetermined spaces. The cam loci of the cam grooves 7j, 7k, and 7l are the same as those of the cam grooves 7d, 7e, and 7f.

As described above, while the linear barrel 5 fixes the first and third lens holding frames 1 and 3, and houses the second lens holding frame 2 or holds the first lens unit L1, the second lens unit L2, and the third lens unit L3, the linear barrel 5 moves along the optical axis. The moving barrel 10 moves along the optical axis in association with the movement of the linear barrel 5. The moving barrel 10 is disposed on the front side and the outer circumference surface side of the linear barrel 5 and the first lens holding frame 1, and separated from the linear barrel 5 and the first lens holding frame 1 by predetermined distances, as illustrated in FIG. 3.

When an external force is applied to the lens barrel LB, a large impact applies to the moving barrel 10. In particular, since main components in the lens barrel LB according to this embodiment are made of metal and heavy, the moving barrel 10 is subject to the large impact. When the moving barrel 10 is integrated with each lens unit and the linear barrel 5 and driven by the same rollers, dents, deformations, etc. may occur on the rollers and cam grooves due to the large impact force and the entire weight. This situation inclines the entire optical system etc., and degrades the optical performance. This embodiment drives the moving barrel 10 through other rollers independent of the linear barrel 5 that holds the lens unit. The moving barrel 10 can hold the optical element different from the lens unit, such as a filter in this embodiment, but does not hold the lens unit. This configuration does not affect the optical performance even when the large impact force and the weight of the entire apparatus dent and deform the rollers and the cam grooves etc. in the moving barrel 10

In addition, the second rollers 33a, 33b, and 33c are assembled in the moving barrel 10 while separated from the cam grooves 7j, 7k, and 7l by predetermined spaces. When the moving barrel 10 receives a large impact, the second rollers 33a, 33b, and 33c contact the cam grooves 7j, 7k, and 7l. This configuration disperses the impact force applied to the first rollers 32a, 32b, and 32c and prevents them from being broken etc.

The lens barrel LB according to this embodiment includes the tilt and shift mechanism part 12 and cannot make long the cam barrel 7 in the optical axis direction due to the space saving requirements. Accordingly, this embodiment provides the non-perforating cam grooves on the inner and outer circumference surface sides in the superimposition manner without making long the cam barrel 7. Other than the perforating cam grooves, all cams are made non-perforating and the cam barrel 7 itself is prevented from lowering the strength and durability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-107524, filed on May 31, 2017, which is hereby incorporated by reference herein in its entirety.

What is claimed is:

1. A lens barrel comprising:
   a first moving barrel configured to hold a lens unit;
   a second moving barrel disposed on an object side and an outer circumference side of the first moving barrel and configured to hold an optical element different from a lens;
   a guide barrel that has a first rectilinear groove that guides a movement of the first moving barrel in an optical axis direction of the lens unit in the first moving barrel, and a second rectilinear groove that guides a movement of the second moving barrel in the optical axis direction; and
   a cam barrel rotatable relative to the guide barrel and having a first cam groove and a second cam groove,
   wherein the first moving barrel includes a first protruding member engaged with the first rectilinear groove and the first cam groove, and
   wherein the second moving barrel includes a second protruding member engaged with the second rectilinear groove and the second cam groove.

2. The lens barrel according to claim 1, wherein the optical element is a filter.

3. The lens barrel according to claim 1,
   wherein the first cam groove is formed on an inner circumference surface side of the cam barrel and does not penetrate the cam barrel, and
   wherein the second cam groove penetrates the cam barrel.

4. The lens barrel according to claim 1,
   wherein the first cam groove is formed on an inner circumference surface side of the cam barrel and does not penetrate the cam barrel, and
   wherein the second cam groove has a cam groove that is formed on an outer circumference surface side of the cam barrel and that does not penetrate the cam barrel and a cam groove that penetrates the cam barrel.

5. The lens barrel according to claim 4, wherein the second protruding member includes a protruding member having a first projection amount and engaged with the cam groove that is formed on the outer circumference surface side of the cam barrel and that does not penetrate the cam barrel by a predetermined space, and a protruding member having a second projection amount larger than the first projection amount and engaged with the second rectilinear groove.

6. The lens barrel according to claim 1, wherein the second moving barrel includes a filter screw on an object side and an inner circumference surface side.

7. The lens barrel according to claim 1, wherein the second moving barrel includes a hood mounting part at an object side and an outer circumference surface side.

8. The lens barrel according to claim 1, wherein the first cam groove and the second cam groove have the same locus.

9. The lens barrel according to claim 1, wherein the cam barrel is configured to rotate at a constant position relative to the guide barrel in the optical axis direction.

10. An optical apparatus comprising:
    a lens barrel; and
    an imaging element,
    wherein the lens barrel includes:
       a first moving barrel configured to hold a lens unit;
       a second moving barrel disposed on an object side and an outer circumference side of the first moving barrel and configured to hold an optical element different from a lens;
       a guide barrel that has a first rectilinear groove that guides a movement of the first moving barrel in an optical axis direction of the lens unit in the first moving barrel, and a second rectilinear groove that guides a movement of the second moving barrel in the optical axis direction; and
       a cam barrel rotatable relative to the guide barrel and having a first cam groove and a second cam groove,
       wherein the first moving barrel includes a first protruding member engaged with the first rectilinear groove and the first cam groove, and
       wherein the second moving barrel includes a second protruding member engaged with the second rectilinear groove and the second cam groove.

* * * * *